Feb. 16, 1954
A. A. ANGLEMYER
2,669,426
POWER UNIT
Filed Oct. 26, 1950
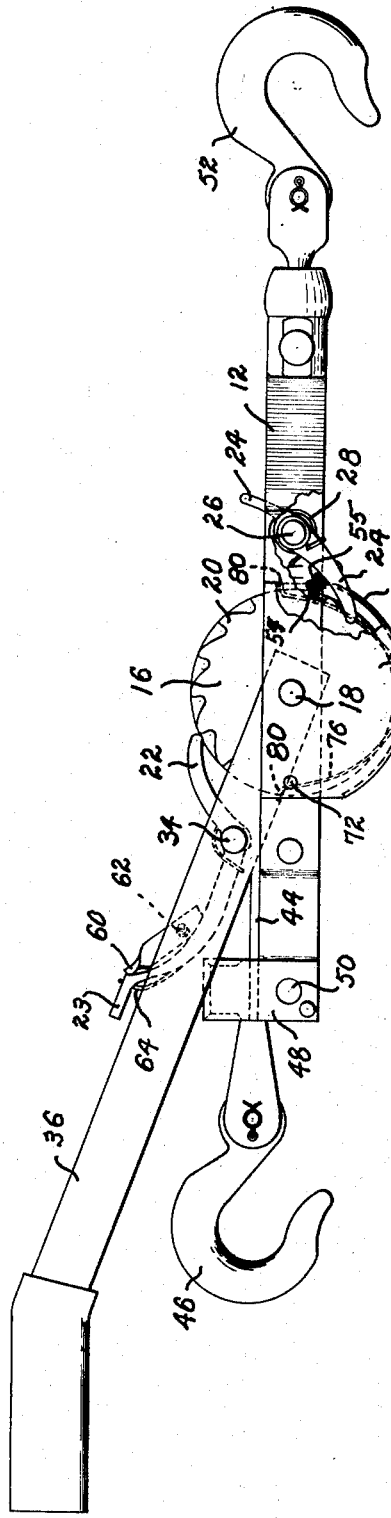
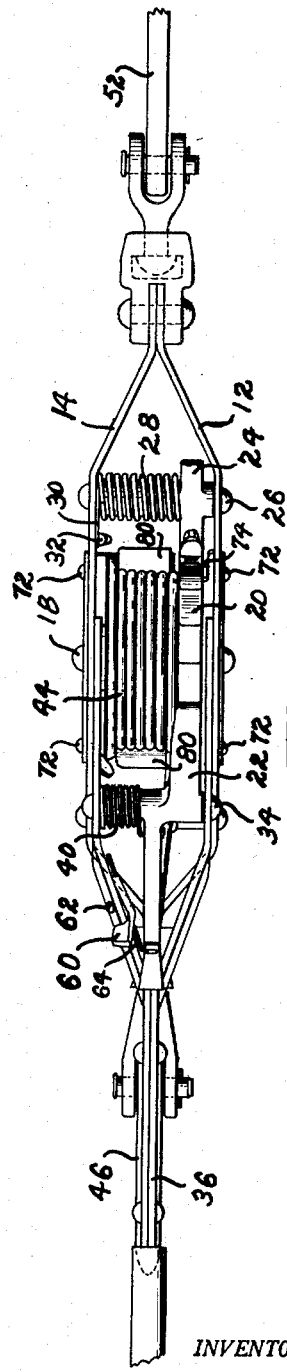
INVENTOR.
ALFRED A. ANGLEMYER.
BY Dybvig & Dybvig.
HIS ATTORNEYS Patented Feb. 16, 1954

2,669,426

UNITED STATES PATENT OFFICE 2,669,426

POWER UNIT

Alfred A. Anglemyer, Dayton, Ohio

Application October 26, 1950, Serial No. 192,328

5 Claims. (Cl. 254—164)

1

This invention relates to a power unit and more particularly to a reversible hand operated unit of the windlass type in which rotary motion is imparted to a cable winding drum through pawl and ratchet mechanisms, the latter being operated by an oscillatory lever.

It is an object of this invention to provide a power unit of the type disclosed in my Patent No. 2,501,253 with a simple, yet durable, drum and cable guard which makes it possible to use the power unit up against a wall or the like, such as when the unit is used for opening freight car doors.

More particularly, it is an object of this invention to provide a simple and inexpensive stamped sheet metal cable drum guard or housing which also serves as a support for a cable guard.

It is recognized that a large number of power units of various types have been made from time to time in which the main frame has included a housing portion for enclosing the pawl and ratchet mechanisms, but these old devices have represented expensive and oftentimes troublesome arrangements in that the housings themselves have been subject to breakage or have interfered with the use or repair of the device. It is an object of this invention to provide a low cost sheet metal stamping element for use in protecting those parts of the power unit which are most subject to damage.

Other objects and advantages reside in the construction of parts, the combination thereof and the mode of operation, as will become more apparent from the following description.

In the drawing:

Figure 1 is an elevational view (with parts broken away) showing a power unit constructed in accordance with my invention; and Figure 2 is an elevational view (with parts broken away) of the device shown in Figure 1 but taken at right angles to the view in Figure 1.

For convenience of description only, the power unit shown herein will be described as a hoist, whereas it has many other uses and is capable of exerting a pull in any direction.

Referring now to the drawing wherein I have shown a preferred embodiment of my invention, reference numerals 12 and 14 designate a pair of frame members which are spaced from one another intermediate the ends thereof and come together and contact one another at each end, as best shown in Figure 2. The frame members 12 and 14 serve to support a drum 16 which is rotatably mounted on a stationary shaft 18 supported between the frame members 12 and 14. The one flange of the drum 16 is provided with a series of ratchet teeth 20 which are adapted to be engaged by the feed or operating lever pawl 22 and the retainer or stop pawl 24.

The retainer or stop pawl is pivotally supported on a stationary pin 26 which in turn is supported between the frame elements 12 and 14, as shown. A torsion spring 28 has its one end 30 anchored to a projecting ear 32 formed as an integral part of the frame element 14 and has its other end hooked over the retainer pawl 24 so as to bias the retainer pawl into engagement with the teeth 20 at all times. The body of the spring 28 surrounds the axially extending bearing portion of the retainer pawl 24, as best shown in Figure 2.

The lever pawl 22 is pivotally supported on a pin or shaft 34 which in turn is supported between the arms of the Y-shaped operating handle or lever 36. The arms of the Y-shaped lever 36 straddle the cable drum 16 and are pivotally supported on the shaft 18 which serves to support the drum 16. The pawl 22 is normally biased into engagement with the teeth 20 by means of the torsion spring 40 which has its one end anchored to the projecting ear 42 which is formed as an integral part of the operating handle and which has its other end hooked onto the pawl in such a manner as to bias the pawl into engagement with the teeth 20.

A flexible cable or rope 44, which has its one end anchored to the drum 16, is adapted to be wrapped around the drum as the operating lever is rotated clockwise, as viewed in Figure 1 of the drawing. As the cable 44 wraps around the drum, the free end of the cable serves to exert a pull on the load.

For purposes of illustrating my invention, I have shown a hook 46 attached to the free end of the cable, whereas any type of load engaging or anchor mechanism, such as a wire clamp or the like, may be attached to the free end of the cable.

A cable guide clamp 48 is provided, as shown, and is riveted or otherwise secured to the one end of the frame elements 12 and 14. For purposes of illustration, I have shown a rivet 50 which serves the multiple purpose of attaching the cable guide clamp 48 to the main frame and also serves to hold the ends of the main frame in assembled relationship. Any suitable means, such as the combination chain and hook assembly 52, may be used for fastening the other end of the power unit to some suitable object. The chain and hook assembly 52 is normally fastened to some stationary object, but either or both ends of the power unit may be fastened to some object which is to be moved or stretched.

It very frequently happens that it is necessary to allow the cable to unwind from the drum 16, such as when it is desired to lower a load by means of the hoisting mechanism. It also frequently happens that it is necessary for the operator to use both hands while operating the hoist and for that reason it is desirable to provide some simple arrangement whereby the load may be lowered without the need for manually holding the retainer pawl out of engagement with the teeth 20.

In the lifting device shown, I have provided a retainer pawl lifting element 54 which is attached to the lower face of the pawl 24, as shown, so as to be engaged by the feed pawl 22 when the operating handle is moved to a position in which the feed pawl 22 moves underneath the retainer pawl 24. The retainer pawl lifting element 54 is biased into the position in which it is shown in Figure 1 by means of a coil spring 55. The spring 55 is strong enough to overcome the torsional effect of the retainer pawl biasing spring 28 and is arranged to hold the retainer pawl in a lifted position while the ratchet wheel 20 is moved in the reverse direction one notch at a time. In order to cause rotation in the reverse direction, it is necessary to hold the pawl 22 out of engagement with the ratchet teeth 20 until the pawl 22 moves under the retainer pawl 24, at which time it is forced into engagement with the ratchet teeth 20. Since there may be times when the operator cannot conveniently use any of his fingers for operating the feed pawl 22, I have provided a spring mechanism for biasing the feed pawl out of ratchet engaging position. This mechanism comprises a lever 60 which is pivotally secured to the operating handle 36 at point 62 for engaging a spring 64 which has its one end rigidly fixed to the lever projection 23. When the lever 60 occupies the position in which it is shown in Figure 1 of the drawing, it does not exert enough pressure on the spring 64 to hold the feed pawl out of engagement with the teeth on the ratchet 20, but when the lever 60 is turned through an angle of 90°, it exerts sufficient pressure on the free spring 64 so that the feed pawl lever 22 will normally ride over the teeth 20 without engaging the same until the element 54 forces the feed pawl 22 into engagement with the notch next to the notch in which the retainer pawl 24 is engaged. For a more detailed description of the principle of operation involved, reference is hereby made to my earlier patent wherein a somewhat similar arrangement is more fully shown and described.

Due to the load on the cable and the shape of the ratchet teeth, the force of the spring 55 acting against the retainer pawl 24 will not cause the retainer pawl 24 to move out of engagement with the teeth of the ratchet until after the feed pawl 22 has rotated the ratchet 20 far enough to allow the retainer pawl to move out of engagement with the ratchet teeth. The arrangement of the spring 55 and the element 54 is such that after the retainer pawl has been lifted from engagement with the teeth on the ratchet 20, the ratchet may be rotated far enough so as to lower the load one notch before the element 54 permits the retainer pawl to re-engage the ratchet 20.

The term cable, as used herein, is intended to include any flexible means capable of being wound around the drum 16 and is not intended to be used in a more limited sense.

It frequently happens that power units of the type shown herein are used in close quarters wherein the one side of the cable winding drum is caused to brush up against a wall or the like. In order to avoid damage to any such wall and in order to avoid interference with the operation of the cable winding drum, I have provided a stamped sheet metal housing or shroud 70 which is adapted to at least partially enclose the one side of the cable winding drum. This housing element 70 is substantially U-shaped in cross section with the arms of the U straddling the frame elements 12 and 14, as shown. The shroud 70 is held in place by the main shaft 18 which is used for supporting the cable winding drum. In order to prevent the housing 70 from rotating about the shaft 18, I have provided rivets or drive screws 72 which further secure the housing 70 in place on the frame elements 12 and 14.

The housing 70 is cut away, as indicated at 74, so as to provide suitable clearance for the retainer pawl 24. In order to make it practical to use cable elements 44 which are relatively stiff and which inherently tend to form larger than necessary loops on the cable winding drum when there is no load hoisted or pulled by the unit, I have provided a cable guard 76 which is riveted or otherwise secured to the housing 70 at 78. This cable guard is a substantially U-shaped spring element having curved ends, as indicated at 80, for guiding the cable and holding the cable against the drum.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a power device, a support comprising a pair of spaced frame members, a drum mounted between said frame members, means for rotatably mounting said drum between said frame members, a one-piece stamped sheet metal housing element for partially enclosing said drum, said stamped sheet metal housing element comprising a substantially U-shaped stamping having the arms thereof straddling said drum and held in place on said support by said means for mounting the drum on the support, a U-shaped cable guard mounted in said housing element, a ratchet disposed between said arms and drivingly connected to said drum, flexible means having one end thereof secured to said drum, an operating handle pivotally mounted on said support on the side opposite said housing, a feed pawl pivotally supported on said handle and arranged to engage said ratchet, first spring means for biasing said feed pawl into engagement with said ratchet, retainer pawl means, second spring means for biasing said retainer pawl means into engagement with said ratchet, a retainer pawl lifting element attached to the lower base of said said retainer pawl and cooperating with said feed pawl to disengage said retainer pawl from said ratchet, and means for supporting said retainer pawl means in cooperative relationship with said ratchet.

2. In a power device, a support comprising a pair of spaced frame members, a drum mounted between said frame members, means for rotatably mounting said drum between said frame members, a ratchet drivingly connected to said drum, flexible means having one end thereof secured to said drum, an operating handle pivotally mounted on said support, a feed pawl pivotally supported on said handle and arranged to engage said ratchet, a stamped sheet metal housing element for partially enclosing said drum, said stamped sheet metal housing element comprising a substantially U-shaped stamping having the arms thereof straddling said drum and held in place on said support by said means for mounting the drum on the support, and a substantially U-shaped spring clamp supported by said housing element and having the arms thereof arranged adjacent said drum to guide said flexible means.

3. In a power device, an elongated body including a pair of frame members juxtaposed at their respective ends and spaced apart in parallel relation at an intermediate portion thereof, the members diverging between the ends and intermediate portion, means securing the members together at the respective ends, a drum disposed between the members at the intermediate portion, means for rotatably supporting said drum, means for intermittently rotating the drum, a flexible member adapted to wind on the drum, and a stamped sheet metal housing at least partially enclosing said drum, said stamped sheet metal housing comprising a substantially U-shaped element having the arms of the U straddling the drum, a U-shaped guard mounted in said housing straddling said drum, said means for rotatably supporting the drum serving to hold said arms in assembled relationship relative to said frame members.

4. In a power device, a pair of stamped sheet metal frame members juxtaposed at their respective ends and spaced apart in parallel relation at an intermediate portion thereof, means securing the members together at the respective ends, a drum mounted between the members and having a portion projecting beyond said members, means for enclosing said projecting portion comprising a U-shaped stamped sheet metal housing element, a common means for holding said housing element, drum and frame members in assembled relationship, and a U-shaped cable guard, means for securing the bight of the U-shaped cable guard to the bight of said U-shaped housing element, the arms of said U-shaped cable guard extending towards opposite sides of said drum.

5. In a power device, a support comprising a pair of spaced frame members, a drum mounted between said frame members, means for rotatably mounting said drum between said frame members, a one-piece stamped sheet metal housing element for partially enclosing said drum, said stamped sheet metal housing element comprising a substantially U-shaped stamping having the arms thereof straddling said drum and held in place on said support by said means for mounting the drum on the support, a U-shaped cable guard mounted in said housing element adjacent to said drum, a ratchet disposed between said arms and drivingly connected to said drum, a flexible means having one end thereof secured to said drum, an operating handle pivotally mounted on said support on the side opposite said housing, a feed pawl pivotally supported on said handle and arranged to engage said ratchet, first spring means for biasing said feed pawl into engagement with said ratchet, retainer pawl means carried by said frame members and having a ratchet engaging end extending within said housing so as to be protected thereby, and second spring means for biasing said retainer pawl means into engagement with said ratchet.

ALFRED A. ANGLEMYER.

References Cited in the file of this patent

UNITED STATES PATENTS

| Number | Name | Date |
|---|---|---|
| 470,674 | Hoffmeister | Mar. 15, 1892 |
| 676,994 | O'Keefe | June 25, 1901 |
| 1,060,103 | Leihy | Apr. 29, 1913 |
| 1,124,938 | Moulton | Jan. 12, 1915 |
| 1,530,844 | Mickler | Mar. 24, 1925 |
| 1,707,560 | McKissick | Apr. 2, 1929 |
| 2,270,271 | Coffing | Jan. 20, 1942 |
| 2,501,253 | Anglemyer | Mar. 21, 1950 |
| 2,506,029 | Maasdam | May 2, 1950 |